Sept. 21, 1954     W. GEMEINHARDT     2,689,742
LIFTING WHEEL SUSPENSION
Filed Dec. 5, 1950                                                3 Sheets-Sheet 1
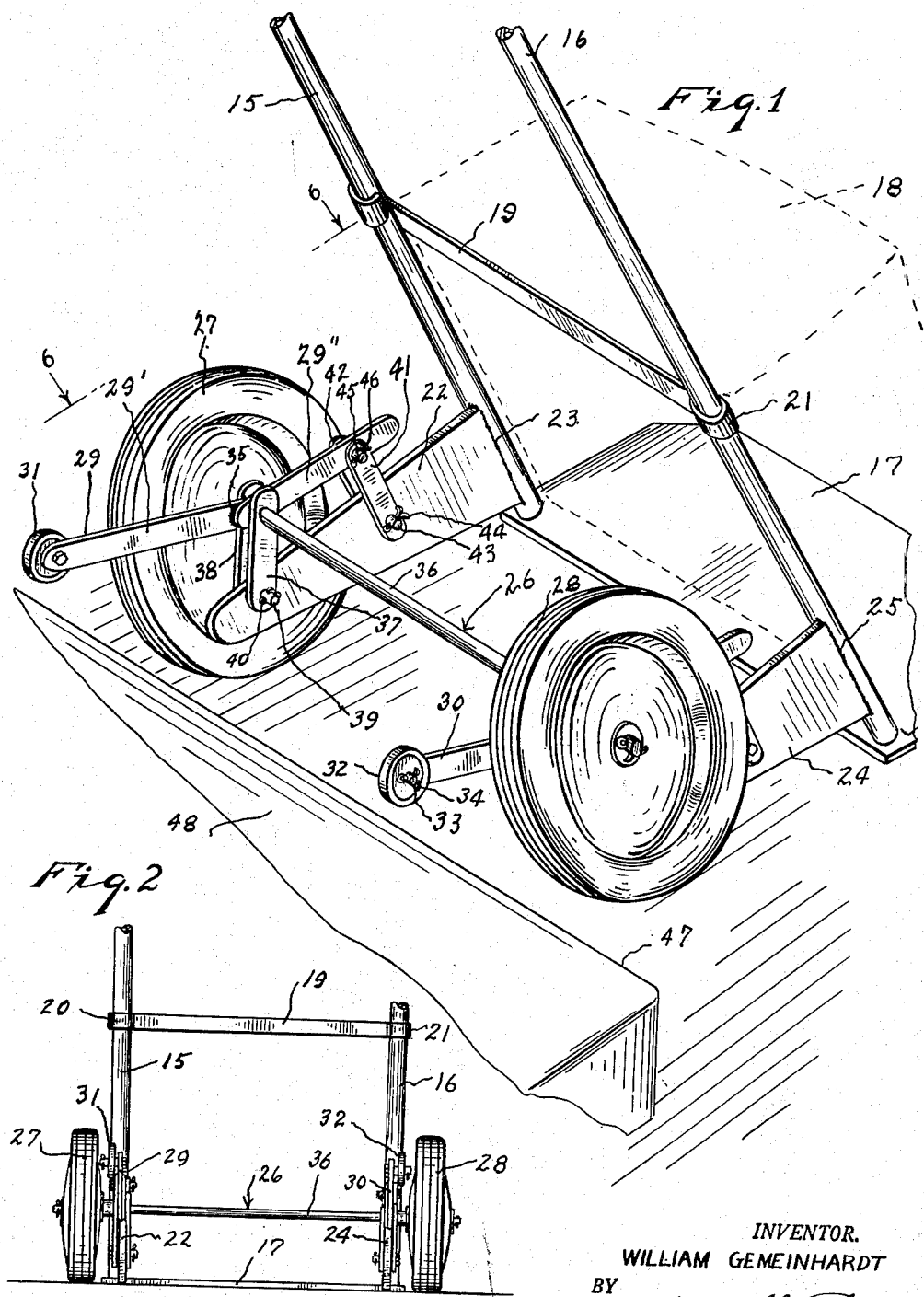
INVENTOR.
WILLIAM GEMEINHARDT
BY
ATTORNEY

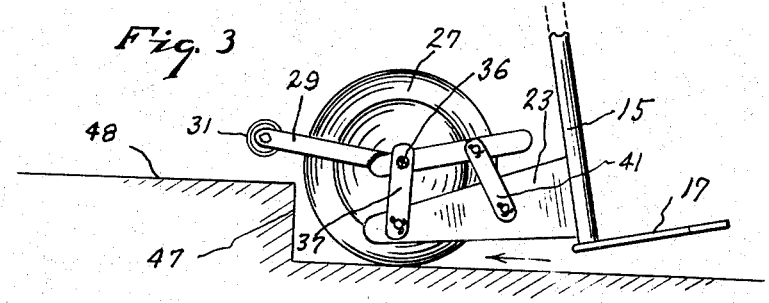
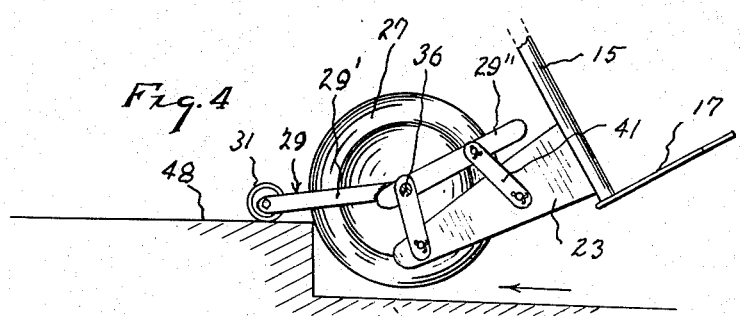
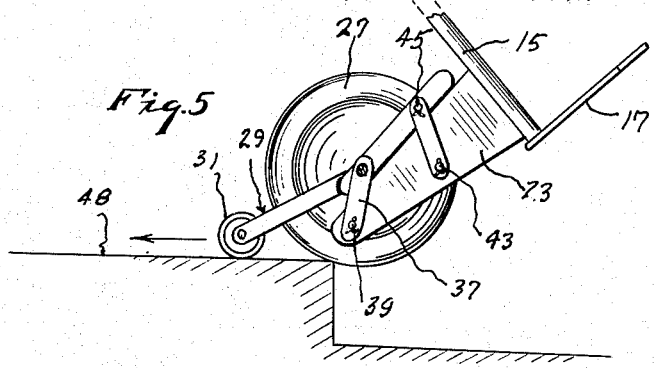
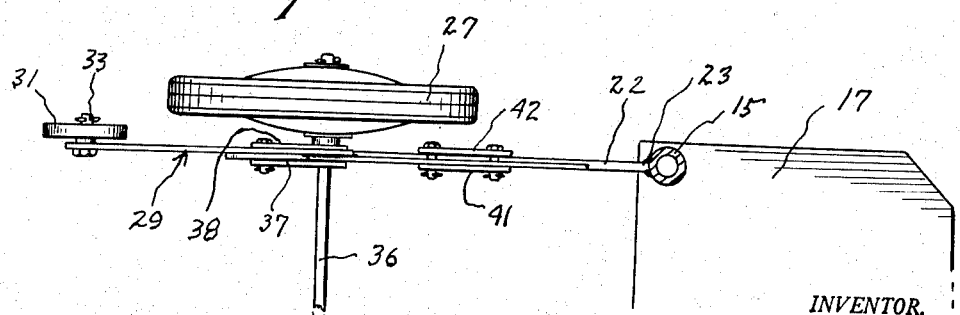

Sept. 21, 1954 W. GEMEINHARDT 2,689,742
LIFTING WHEEL SUSPENSION
Filed Dec. 5, 1950 3 Sheets-Sheet 3
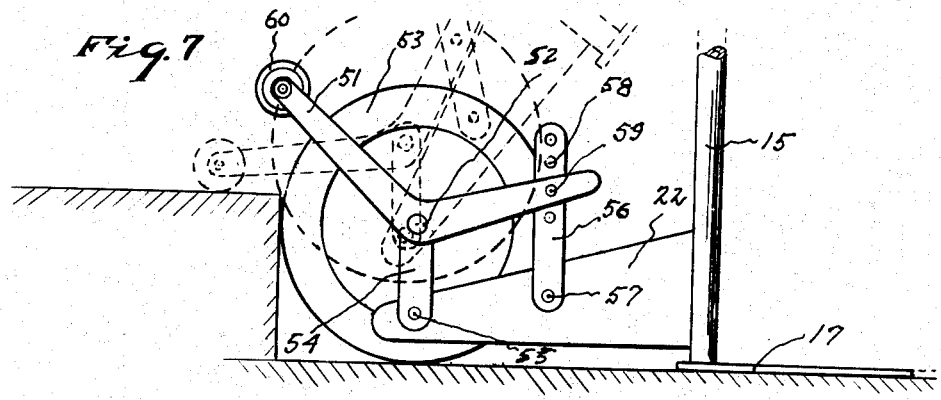
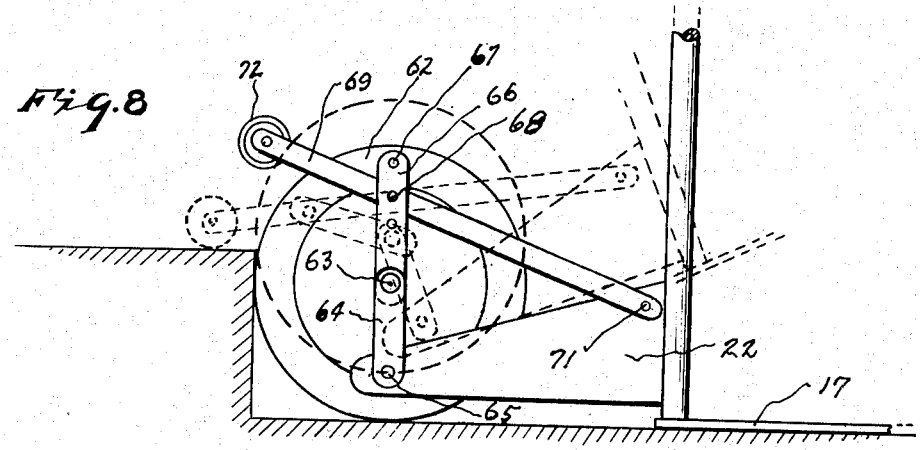
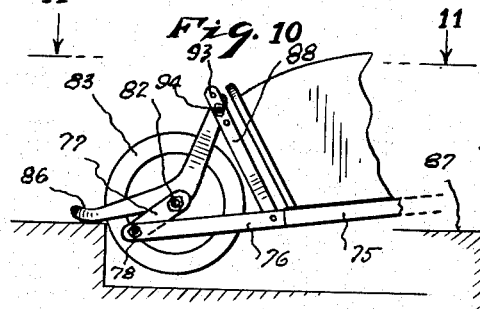
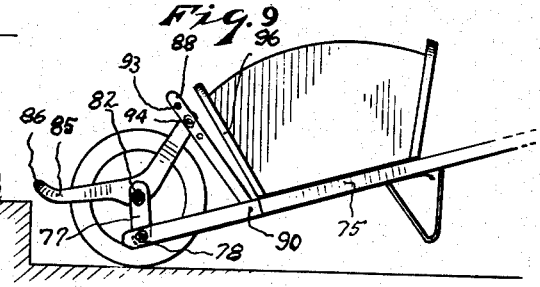
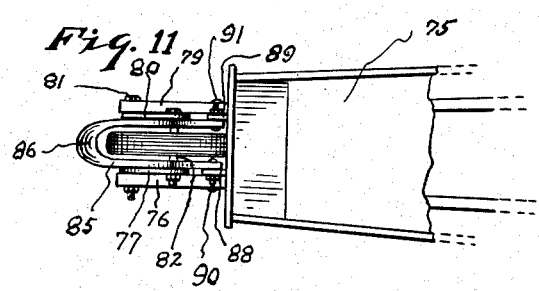
INVENTOR.
WILLIAM GEMEINHARDT
BY
ATTORNEY Patented Sept. 21, 1954

2,689,742

UNITED STATES PATENT OFFICE 2,689,742

LIFTING WHEEL SUSPENSION

William Gemeinhardt, New York, N. Y.

Application December 5, 1950, Serial No. 199,333

14 Claims. (Cl. 280—5.32)

This invention relates to a lifting suspension device for hand and power operated trucks, wheel barrows, baby carriages, wheeled shopping baskets and the like, and four wheeled vehicles generally.

It is an object of the present invention to provide a lifting suspension device for hand trucks, wheel barrows, wheeled shopping baskets and the like which is readily available for the lifting of the same over a curb or other steep obstacles with little effort being applied to the vehicle when engagement has been made with the top of the elevated surface by the small lifting wheels or by the projection of the portions of the suspension means thereupon.

It is another object of the present invention to provide in a lifting wheel suspension for vehicles an arrangement wherein upon the lifting elements engaging with the elevated surface, the action required to effect the lifting of the load is such that the same is pivoted in a mechanical lever action with the mechanical advantage being at the hand of the operator whereby heavy loaded vehicles can be handled with ease and by an easy downward swinging motion of the handle of a hand truck and less fatiguing than when a direct pull is required, as with the conventional loaded hand truck to pull the wheels of the same over the curb of a sidewalk.

It is another object of the present invention to provide a lifting vehicle suspension wherein the lifting features are incorporated in the vehicle suspension so that movement of the wheels relative to the frame of the vehicle can be effected to give a smoother riding vehicle upon rough surfaces and a cushioning and shock damping action and whereby the hand truck or the like can pass over rough surfaces with a minimum of jarring and shaking motion.

It is still another object of the present invention to provide a lifting suspension means for hand vehicles which, while being adapted for the lifting of heavy loads onto elevated surfaces with a minimum of muscular effort, is likewise adapted for the handling of the load to lower the same from an elevated surface to a lower surface with the same minimum of muscular effort.

Other objects of the present invention are to provide a lifting suspension means for hand vehicles which is of simple construction, inexpensive to manufacture, easy to install upon the vehicle frame, has a minimum number of parts, readily available for engagement with an elevated surface, requires little clearance space under the truck frame, compact, made of sturdy and rugged parts and efficient in operation.

For other objects and for a better understanding of the invention, reference may be had to the following detailed description taken in connection with the accompanying drawing, in which Fig. 1 is a fragmentary perspective view of a hand truck having the lifting suspension means, constructed according to one form of the invention, connected thereto.

Fig. 2 is a fragmentary rear elevational view of the truck with the truck being supported on its bottom toe plate.

Figs. 3, 4 and 5 are fragmentary side elevational views of the hand truck with the vehicle suspension means having its lifting member adapted for engagement with an elevated surface to raise the truck and showing respectively the position of the truck and the parts of the lifting suspension means at different positions in the process of effecting the elevation of the truck onto the elevated surface.

Fig. 6 is a transverse sectional view of the truck shown in Fig. 1 looking down upon one side of the suspension means and as viewed on line 6—6 of Fig. 1.

Fig. 7 is a fragmentary side elevational view of a modified form of construction as applied to a hand truck and in which means is provided for adjusting the mechanism for operation upon different levels, and with the hand truck backed up to an elevated surface and with illustration made with dotted lines as to the application of the lifting projection wheel upon the elevated surface to show the manner in which the truck is lifted.

Fig. 8 is a fragmentary side elevational view of a hand truck with a still different form of the vehicle suspension means connected thereto, the lifting projection being in the form of a straight link or arm pivotally connected to the truck bracket and adjustably connectable to one of two links that are connected between the truck bracket and the lifting arm, the axle for the large wheel serving as the pivot connection between the links.

Fig. 9 is a side elevational view of a wheel barrow with a still further form of the invention applied thereto, the wheel barrow being supported upon the surface and the projecting and lifting member about to be extended onto an elevated surface.

Fig. 10 is a fragmentary side elevational view of the wheel barrow and lifting suspension means shown in Fig. 9 with the lifting arm engaging with the top surface and the wheel barrow in the process of being elevated thereonto.

Fig. 11 is a fragmentary top plan view of the wheel barrow and the lifting suspension means thereof and as viewed on line 11—11 of Fig. 10.

Referring now particularly to Figs. 1 to 6, 15 and 16 represent respectively side members of a hand truck. These members are tied together at their lower end by a forwardly extending toe plate 17 that is adapted to pass under a load 18, to support the same against downward displacement and upon the side frames 15 and 16. The side frames 15 and 16 are connected together above the plate 17 by a tie or transverse support 19 wrapped at its ends, as indicated respectively at 20 and 21, about the members.

Projecting rearwardly from the lower end of the side member 15 is a long plate bracket 22 which is secured at its inner end by welding 23 with the member 15. At the opposite side of the truck is a similar rearwardly extending bracket 24 secured to the lower end of the side member 16. This bracket 24 is similarly secured by welding 25 with the member 16. Both of these brackets 22 and 24 are tapered and are parallel to one another. On these brackets are supported the lifting suspension means, indicated generally at 26, which, in addition to including large wheels 27 and 28 on which the truck normally rolls, also includes rearwardly extending lifting arms 29 and 30 having respectively small wheels 31 and 32 journalled thereon. Each of these wheels are connected to the lifting arms by pivot pin 33 and is held against axial displacement thereon by a cotter pin 34 extending through the pivot pin.

The lifting arm 29 is formed of two members 29' and 29" welded together at their overlapped ends, as indicated at 35, and with the member 29' being slightly angled and inclined upwardly from the member 29". By the union of the two members 29' and 29" at the welded location 35 adequate bearing surface is provided for an axle shaft 36 that extends therethrough. This shaft is supported upon the bracket 22 by parallel links 37 and 38 disposed on the opposite sides thereof and pivotally connected thereto by a pivot pin 39 that is held in place by a cotter 40.

Forwardly of the links 37 and 38 are parallel links 41 and 42 disposed respectively at the opposite sides of the bracket 22 and pivotally connected to the bracket by a pivot pin 43 and cotter 44 and pivotally connected to the member 29" of the lifting arm 29 by a pivot pin 45 and cotter 46. The lifting arm 30 at the opposite side of the truck is similarly supported on the bracket 24 with parallel links and pivot pins. It is believed that the description for the mounting of the lifting arm 29 is sufficient to show how the lifting arm 30 is mounted. The lifting arm 30 has two members welded together and the shaft 36 extends through the overlapped ends of the members.

To effect the operation of the lifting suspension, the hand truck is backed up to the curb 47 having a top surface 48 so that the lifting arms 29 and 30 extend over the top surface. By lever action and by depressing the handle of the truck, the small wheels 31 and 32 engage the curb and the lower end of the truck will be elevated along with the large wheels onto the top surface 48. By a simple rolling movement over the top surface, the large wheels 27 and 28 will pass thereover and the truck can then be handled upon the large wheels.

It will be noted that the links 37 and 38 are of less length than the radius of the wheels 27 and 28. The links 41 and 42 will control the movement of the forward end of the lifting arm 29. The member 29" can have its lower edge brought to rest on the upper edge of the bracket 23 and the lifting arm 30 at the opposite side of the truck will be similarly engaged with the upper edge of the bracket 24. When so arranged, there is a free support of the axle and the wheels through the lifting arms upon the brackets 22 and 23. The truck frame can be tilted to a position such that it can be moved over the surface on the large wheels. In this manner, the lifting arms with their wheels will prevent the rearward tilt of the truck and in that manner provide a rear support for the same. In other words, the truck can always be held in an upright and inclined manner by being supported upon the lifting arms and without the toe plate 17 being lowered to the floor.

In Fig. 7, there is shown a slightly different type of construction wherein the lifting arm is formed with a greater angle between the portions thereof, as indicated at 51, and which has more the shape of a bell crank. An axle 52 extends through the crank 51 and the angle bend thereof and supports wheels 53, only one of which being shown. Supporting links 54 extend between the shaft 52 and the bracket 22 and are connected with the bracket 22 by a pin 55. Links 56 are pivotally connected to the bracket by a pin 57 and these links 56 have a plurality of adjusting holes 58 for receiving the pin 59 which connects the forward end of the lifting arm or bell crank 51 with the links. Accordingly, there is provided in the arrangement means for adjusting the hand truck for elevation over different height elevations with which the truck is to encounter. If the elevation is a high one, it will be well to have the lifting arm 51 moved so that the pin 59 passes through a low adjusting hole 58 in the links 56. The elevation being a low one, the pin 59 can extend through the uppermost holes 58 of the links 56. Small supporting wheels 60 are provided on the rear end of the lifting arm 51. The truck will be used in the same manner as above described and backed up to the elevation so that the small wheels 60 can engage with the top surface of the elevation and by a lever action the truck raised onto the small wheels and the large wheels 53 brought to the elevation. When the support of the truck is again upon the large wheels, the lifting arm 51 can swing forwardly with the links 54 and 56 so that its lower edge may rest adjacent the upper edge of the bracket 22 and to allow for proper tilting of the truck for the purpose of transport.

In Fig. 8, there is shown a still further form of the invention wherein wheels 62, only one being shown, are supported on a shaft 63 and links 64 pivotally connected by a pin 65 to the rear end of the bracket 22. Also connected to the shaft 63 is an upper link 66 having adjusting holes 67 therein adapted to receive a pin 68 for the connection of a long straight lifting arm 69 therewith which is pivotally connected at 71 to the forward part of the bracket 22 and which has a small engaging wheel 72 adapted to engage the top surface of the elevation. By having the adjusting holes 67 in the upper link 66, the lifting arm can be set for different elevations with which the truck is to be used. When the lifting action is effected, the links 64 and 66 can pivot about the shaft 63 and can angle relative to each other, as shown in dotted lines in Fig. 8 in order to have the proper engagement with the top surface of the curb. Once the support is had upon the small wheel 72, movement of the truck on the elevated top surface of the curb can be effected. With the large wheels 62 over the upper edge and on the top surface, the support of the truck is had on the large wheels and movement of the truck along the surface can be readily effected while permitting the easy tilting rearwardly of the truck to the proper angle to facilitate the movement thereof. The small wheel 72 and the lifting arm 69 will be readily lifted to an out-of-the-way position and without giving any interference with the tilting of the truck as it is operated over the surface.

Referring now particularly to Figs. 9, 10 and 11, there is shown the invention applied to a wheel barrow in a slightly different form of the same. The wheel barrow is indicated at 75 and has a forward extension 76. On the end of this extension there is connected a link 77 by means of a pivot pin 78. There are two of these extensions on the wheel barrow, as seen clearly in Fig. 11. The extension at the opposite side of the wheel barrow is indicated at 79 and a link 80 is pivotally connected by a bolt or pivot pin 81 to the extension 79. An axle 82 extends between the links and wheel 83 is pivoted thereon. The wheel is adjustable with the link 77 to either elevated or lowered positions. When the wheel barrow is on the level surface and ready to be used, the wheel will assume the position shown in Fig. 9. A U-shaped lifting arm 85 has a forward closed portion 86 that is slightly turned up to engage a top surface 87 of the curb. This U-shaped member has two legs and these legs are respectively connected intermediate their length to the shaft 82. The legs have an angle bend in them and their rear ends are respectively connected to long pivot links 88 and 89 pivoted respectively, as indicated at 90 and 91, to the wheel barrow extensions 76 and 79. The upper ends of each of these links have adjusting holes 93 which are connected by pivot pins 94 with the legs of the U-shaped lifting member. The lifting member can be adjustably connected to the upwardly extending long links 88 and 89 in a position depending upon the height of the curbs on which the wheel barrow is to be used. The links 88 and 89 are long and are allowed to lie sufficiently ahead of the front board of the wheel barrow indicated at 96 so as to allow angular movement for the operation of the lifting member. As the lifting member 85 engages with the top surface 87, the wheel barrow can be lifted upwardly to a point where the wheel 83 can readily clear the top surface. The pressure from the wheel barrow is extended onto the lifting member through the long links 88 and 89.

In all of the forms of this invention there are provided a closed linkage of at least three movable links and one of which has the lifting arm extension thereupon for the engagement with the elevated surface. In certain of the forms, provision is made for an adjustment of one of the links so that the lifting extension can be readily adapted for elevations within a certain range. It will be seen that this adjustment of the links can be effected by a simple removal of a pivot pin and the placing of the same in another adjusting hole of the link. In all cases the wheel axle is supported on movable links and the links have less length than the radius of the wheel.

It will be apparent that there has been provided a lifting or climbing device which, when arranged on a hand truck, wheel barrow, wheeled shopping basket, baby carriage and the like, enables the operator to lift a very heavy load from the roadway to the sidewalk or onto the top surface of a curb with an easy mechanical action movement which is in a downward swinging direction in the case of the hand truck and which is with a lifting motion in the case of the wheel barrow. As the truck or wheel barrow wheels stop at the curb, the arms of the device project over the surface of the sidewalk and the pivoting movement is effected in a mechanical lever manner to easily place the truck or wheel barrow wheels onto the top surface. In instances, the height of the curb may be as much as eighty per cent of the diameter of the wheel depending upon the length of the links and the adjustment of the same relative to one another.

It will be further apparent that the operator can easily use the device for lowering the load downwardly over the curb. By simply shifting the load onto the small wheels and extending the large wheels outwardly over the curb, they can be lowered downwardly in an easy manner so that the load is readily transferred to the large wheels and the truck or wheel barrow is lowered to the lower level.

It will also be apparent that the wheels being connected to swing links that a swinging wheel suspension has been effected. This makes for a smooth riding of the truck and of the goods disposed therein. The truck or wheel barrow can be moved easily over a rough surface.

While various changes may be made in the detail construction, it shall be understood that such changes shall be within the spirit and scope of the present invention as defined by the appended claims.

What is claimed is:

1. A lifting suspension device for hand trucks and the like comprising an assemblage of links pivotally connected together for angular adjustment relative to one another and adapted for connection to a bracket or extension upon the hand truck or the like for collapsing movement with respect to each other, a wheel axle forming the pivot connection between certain of the links and removed from their connection with the extension upon the hand truck or the like, a supporting wheel secured to the axle and the length of the link between the axle and the bracket being less than the radius of the supporting wheel and a lifting arm formed of certain of the links for engagement with the elevated surface and on which the load is taken to elevate the supporting wheel thereonto.

2. In a hand truck, a main frame comprising side members and a toe plate extending forwardly from the lower ends thereof, brackets rigidly secured to the lower ends of the side frame members and extending rearwardly, an assembly of three links connected to each of said brackets, said assembly comprising two end links and an intermediate link, said end links being respectively pivotally connected to the bracket, said intermediate link lying thereabove, an axle extending between the link assemblies, main supporting wheels carried by the axle, said axle serving as the pivotal connection between the rearwardmost links of the respective assemblies and the intermediate links of the respective assemblies and a lifting arm extending rearwardly from the intermediate link of each assembly and adapted to have engagement with an elevated surface, said link of each assembly connected between the bracket and the axle being shorter in length than the radius of the supporting wheel.

3. A hand truck comprising a main frame having side frame members and a toe plate, brackets extending rearwardly from the respective side frame members, said brackets being transversely aligned with each other and respectively having straight edges, a linkage assembly mounted on each of the brackets and extending above the edge thereof, each linkage assembly comprising two pairs of parallel links pivotally connected together by an intermediate link adapted upon collapse of the assemblage to rest upon the edge of the bracket, a lifting arm extension connected to the intermediate link and angled with respect thereto, a shaft extending between the linkage assemblies and through the connection of the parallel links with the intermediate link of each assembly and at the connection of the lifting arm therewith, main supporting wheels connected to the ends of the shaft, the lifting arm extending outwardly beyond the periphery of the main supporting wheels and adapted to engage with the elevated surface, the parallel links of each assembly connected between the bracket and the shaft being of less length than the radius of the supporting wheel.

4. A hand truck commprising a main frame having side frame members and a bottom toe plate connecting the lower ends of the members together, bracket members connected to the lower ends of the side frame members and extending rearwardly therefrom, a linkage assembly connected to each bracket, said linkage assembly comprising two end links spaced from one another and respectively pivotally connected to the bracket, and a bell crank shaped member connected between the links, said bell crank shaped member providing a lifting arm, a shaft extending between the linkage assemblies and providing the pivotal connection of the bell crank member of each assembly with the rear link thereof, supporting wheels on the ends of the shaft, said lifting arm of the bell crank member adapted to engage with an elevated surface and the link of each assembly connecting the shaft with the bracket being shorter in length than the radius of the supporting wheel.

5. A hand truck comprising a main frame having side frame members and a bottom toe plate connecting the lower ends of the members together, bracket members connected to the lower ends of the side frame members and extending rearwardly therefrom, a linkage assembly connected to each bracket, said linkage assembly comprising two end links spaced from one another and respectively pivotally connected to the bracket, and a bell crank shaped member connected between the links, said bell crank shaped member providing a lifting arm, a shaft extending between the linkage assemblies and providing the pivotal connection of the bell crank member of each assembly with the rear link thereof, supporting wheels on the ends of the shaft, said lifting arm of the bell crank member adapted to engage with an elevated surface and the link of each assembly connecting the shaft with the bracket being shorter in length than the radius of the supporting wheel, and the forwardmost link of each link assembly having a plurality of adjusting holes and pin means connecting the bell crank member with any one of the adjusting holes whereby the lifting arm can be adjusted to different elevations.

6. A hand vehicle comprising a main frame having two side members and a bottom toe plate connecting the side members together, brackets rigidly connected to the lower ends of the side frame members and extending rearwardly therefrom, a suspension linkage connected to each of the brackets, said linkage comprising three links, one of the links extending from the forward part of the bracket and pivotally connected thereto and rearwardly to serve as a lifting arm, two articulated links pivotally connected to each other with one link pivotally connected to the rear part of the bracket and the other link pivotally connected to the first mentioned lifting arm link, an axle extending through the pivot connection of the articulated links of each link assembly, supporting wheels connected to each end of the axle respectively, the one of the articulated links connected to the bracket being shorter in length than the radius of a supporting wheel.

7. A hand vehicle comprising a main frame having two side members and a bottom toe plate connecting the side members together, brackets rigidly connected to the lower ends of the side frame members and extending rearwardly therefrom, a suspension linkage connected to each of the brackets, said linkage comprising three links, one of the links extending from the forward part of the bracket and pivotally connected thereto and rearwardly to serve as a lifting arm, two articulated links pivotally connected to each other with one link pivotally connected to the rear part of the bracket and the other link pivotally connected to the first mentioned lifting arm link, an axle extending through the pivot connection of the articulated links of each link assembly, supporting wheels connected to each end of the axle respectively, the one of the articulated links connected to the bracket being shorter in length than the radius of a supporting wheel, and the other of the articulated links having adjusting holes therein and pin means adapted to secure the lifting arm link to either one of the adjusting holes whereby to adapt the hand vehicle to different elevations over which the same is to be elevated.

8. A hand vehicle comprising a main frame having two extensions extending therefrom and laterally spaced from each other, long and short links respectively pivotally connected to each extension and longitudinally spaced from each other, a U-shaped member having side legs pivotally connected between the links, a shaft serving as the pivotal connection between the legs of the forward links and a supporting wheel carried by the shaft, said U-shaped member being closed about the periphery of the wheel and adapted to engage with an elevated surface to facilitate the movement of the vehicle thereonto.

9. A hand vehicle comprising a main frame having two extensions extending therefrom and laterally spaced from each other, long and short links respectively pivotally connected to each extension and longitudinally spaced from each other, a U-shaped member having side legs pivotally connected between the links, a shaft serving as the pivotal connection between the legs of the forward links and a supporting wheel carried by the shaft, said U-shaped member being closed about the periphery of the wheel and adapted to engage with an elevated surface to facilitate the movement of the vehicle thereonto, and said long links having adjusting holes therein and removable pivot pins respectively connecting the legs of the U-shaped member with any of the adjusting holes whereby the U-shaped member can be adapted for different elevations on which the vehicle is to encounter.

10. A lifting suspension device for a vehicle having a main frame with spaced arms extending therefrom, comprising link members pivotally connected at one of their ends to said arms, a supporting wheel for said vehicle, an axle for said supporting wheel, a lifting suspension member to which said axle is pivotally connected at the rotational axis of the wheel, the other ends of said link members being pivotally connected with respect to said axle at the rotational axis of said wheel, and an additional link member pivotally connected at one end to said lifting suspension member and at the other end to said frame.

11. A lifting suspension device as defined in claim 10 in which the free end of the lifting suspension member has a portion for engagement with an elevated obstacle.

12. A lifting suspension device as defined in claim 10 in which the free end of the lifting suspension member is provided with an additional wheel.

13. A hand truck, including a truck frame having an axle shaft, a bracket secured to the truck frame, links pivotally connected to the axle shaft, with one of said links pivotally connected to the bracket, a bracket link pivotally connected to said bracket and to the second of said links, an extension arm pivotally connected to the shaft, truck wheels journalled on said shaft, lifting wheel means mounted on the extension arm and disposed outwardly of the periphery of the truck wheels and means rigidly connecting the extension arm and the said second link.

14. A hand truck according to claim 13 wherein means are provided carried by the second of said links for adjusting the position of said lifting wheels.

No references cited.